United States Patent
Amr et al.

(10) Patent No.: US 11,119,055 B2
(45) Date of Patent: Sep. 14, 2021

(54) METHOD FOR OPERATING AN X-RAY SYSTEM

(71) Applicant: Fraunhofer-Gesellschaft zur Foerderung der angewandten Forschung e.V., Munich (DE)

(72) Inventors: Mahmoud Amr, Fuerth (DE); Tobias Schoen, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 250 days.

(21) Appl. No.: 16/265,627

(22) Filed: Feb. 1, 2019

(65) Prior Publication Data
US 2019/0162680 A1 May 30, 2019

Related U.S. Application Data

(63) Continuation of application No. PCT/EP2017/069688, filed on Aug. 3, 2017.

(30) Foreign Application Priority Data

Aug. 3, 2016 (DE) ...................... 10 2016 214 343.3

(51) Int. Cl.
*G01N 23/083* (2018.01)
*G01N 23/046* (2018.01)
(Continued)

(52) U.S. Cl.
CPC ......... *G01N 23/046* (2013.01); *G06T 7/0012* (2013.01); *G06T 11/003* (2013.01);
(Continued)

(58) Field of Classification Search
CPC ............ G01N 23/046; G01N 2223/401; G06T 1/005; G06T 7/0012; G06T 2207/10072; G06T 2207/10116; G01T 11/003
See application file for complete search history.

(56) References Cited

U.S. PATENT DOCUMENTS 6,200,024 B1 3/2001 Negrelli
6,435,715 B1 8/2002 Betz et al.
(Continued)

FOREIGN PATENT DOCUMENTS

DE 19855213 A1 6/2000
DE 10003518 A1 8/2001
(Continued)

OTHER PUBLICATIONS

Fischer, Andreas et al., "Object Specific Trajectory Optimization for Industrial X-ray Computed Tomography", Scientific Reports, (May 1, 2016), vol. 6, No. 1, doi:10.1038/srep19135, XP055404799, DOI: 10.1038/srep19135, May 1, 2016.

*Primary Examiner* — David P Porta
*Assistant Examiner* — Mamadou Faye
(74) *Attorney, Agent, or Firm* — Perkins Coie LLP; Michael A. Glenn (57) ABSTRACT

A method for operating an X-ray system having the steps of "manually setting the first and a second position for the manipulator on a trajectory by means of a virtual input unit", "recording or simulating recording from the first and second positions" and "representing the two X-ray recordings".

24 Claims, 3 Drawing Sheets

(51) Int. Cl.
*G06T 11/00* (2006.01)
*G06T 7/00* (2017.01)

(52) U.S. Cl.
CPC ...... *G06T 11/005* (2013.01); *G01N 2223/401* (2013.01); *G06T 2207/10072* (2013.01); *G06T 2207/10116* (2013.01)

(56) References Cited

U.S. PATENT DOCUMENTS

| | | | |
|---|---|---|---|
| 8,320,522 B2 * | 11/2012 | Ulrici | A61B 6/14 378/38 |
| 2001/0017909 A1 | 8/2001 | Doubrava et al. | |
| 2002/0181650 A1 | 12/2002 | Ambrosio | |
| 2011/0107270 A1 * | 5/2011 | Wang | G16H 20/40 715/850 |
| 2012/0201352 A1 * | 8/2012 | Dennerlein | A61B 6/4452 378/62 |

FOREIGN PATENT DOCUMENTS

| | | |
|---|---|---|
| DE | 102007005377 A1 | 7/2008 |
| GB | 2533394 A | 6/2016 |
| WO | 2010086706 A1 | 8/2010 |
| WO | 2010128404 A1 | 11/2010 |
| WO | 2013152803 A1 | 10/2013 |
| WO | 2014160766 A1 | 10/2014 |
| WO | 2015197566 A1 | 12/2015 |

\* cited by examiner

METHOD FOR OPERATING AN X-RAY SYSTEM

CROSS-REFERENCE TO RELATED APPLICATIONS

This application is a continuation of copending International Application No. PCT/EP2017/069688, filed Aug. 3, 2017, which is incorporated herein by reference in its entirety, and additionally claims priority from German Application No. 10 2016 214 343.3, filed Aug. 3, 2016, which is also incorporated herein by reference in its entirety.

BACKGROUND OF THE INVENTION

Embodiments of the present invention relate to a method and an apparatus for operating an X-ray system, like particularly a CT system. Further embodiments relate to an X-ray or CT system comprising a corresponding operating apparatus.

Tasks, like non-destructive material testing, are realized using CT systems (X-ray computer tomography systems). In applications like escalation testing, i.e. manual testing as soon as critical errors are suspected, of large elements with most different geometries, manual non-destructive testing by means of X-ray technology is frequently employed. This usually deals with laboratory systems or portal units. A tester here has to design and install partly complicated concepts for holders, or has to guide the X-ray components manually to the test region of the respective element (ROI). Frequently, CTs using this approach are not possible or only at poor an image quality, since these systems cannot generate sufficient data for 3D reconstruction, or the holders installed appear in the reconstruction as foreign objects. By means of a robot-assisted system, such a system obtains the degrees of freedom needed, but operating such systems is considerably more complex, which means that simple manual operation is mostly only possible with a significant simplification of the degrees of freedom in the system. These simplifications in turn prevent detecting sufficient data for 3D reconstruction so that only radiographic (or transmission) testing is possible. This is why there is need for an improved approach.

SUMMARY

According to an embodiment, a method for operating an X-ray system having at least a manipulator, an X-ray source and an X-ray detector, the manipulator being able to move the X-ray source, the X-ray detector or an object, may have the steps of: manually setting a first position for the manipulator on a trajectory by means of virtual input means; simulating recording of the object by means of the X-ray system from the first position in order to obtain a first X-ray projection; representing the first X-ray projection or information derived from the first X-ray projection; manually setting a second position on the trajectory by means of the virtual input means based on the representation of the first X-ray projection or information derived from the first X-ray projection; simulating recording of the object by means of the X-ray system from the second position in order to obtain a second X-ray projection; and storing the at least first and second positions of the trajectory so as to be able to move to the first and second positions at a later point in time or in the measurement to be performed, representing the second X-ray projection or information derived from the second X-ray projection.

According to another embodiment, a method for operating an X-ray system having at least a manipulator, an X-ray source and an X-ray detector, the manipulator being able to move the X-ray source, the X-ray detector or an object, may have the steps of: manually setting a first position for the manipulator on a trajectory by means of virtual input means; recording or simulating recording of the object by means of the X-ray system from the first position in order to obtain a first X-ray projection; representing the first X-ray projection or information derived from the first X-ray projection; manually setting a second position on the trajectory by means of the virtual input means based on the representation of the first X-ray projection or information derived from the first X-ray projection; recording or simulating recording of the object by means of the X-ray system from the second position in order to obtain a second X-ray projection; and representing the second X-ray projection or information derived from the second X-ray projection; wherein the virtual input means have augmented reality input means, at least one sensor glove and/or at least one pointer for marking a position in 3D space.

According to still another embodiment, a method for operating an X-ray system having at least a manipulator, an X-ray source and an X-ray detector, the manipulator being able to move the X-ray source, the X-ray detector or an object, may have the steps of: manually setting a first position for the manipulator on a trajectory by means of virtual input means; recording or simulating recording of the object by means of the X-ray system from the first position in order to obtain a first X-ray projection; representing the first X-ray projection or information derived from the first X-ray projection; manually setting a second position on the trajectory by means of the virtual input means based on the representation of the first X-ray projection or information derived from the first X-ray projection; recording or simulating recording of the object by means of the X-ray system from the second position in order to obtain a second X-ray projection; and representing the second X-ray projection or information derived from the second X-ray projection; wherein the X-ray system is a CT system and the method has the step of starting reconstructing the CT data set based on the first and second X-ray projections in order to obtain a partial CT data set; and wherein the step of representing the first and second X-ray projections or the information derived from the first and second X-ray projections has representing the partial CT data set or information describing the partial CT data set; wherein the method has the further steps of manually setting a further position for the X-ray system by means of the virtual input means and of recording or simulating recording of the objection by means of the X-ray system from the further position in order to obtain a further projection; wherein the steps are repeated until the X-ray recording or the partial CT data set corresponds to a predetermined quality and/or resolution.

Another embodiment may have a non-transitory digital storage medium having stored thereon a computer program for performing a method for operating an X-ray system having at least a manipulator, an X-ray source and an X-ray detector, the manipulator being able to move the X-ray source, the X-ray detector or an object, having the steps of: manually setting a first position for the manipulator on a trajectory by means of virtual input means; simulating recording of the object by means of the X-ray system from the first position in order to obtain a first X-ray projection; representing the first X-ray projection or information derived from the first X-ray projection; manually setting a second position on the trajectory by means of the virtual input means based on the representation of the first X-ray projection or information derived from the first X-ray projection; simulating recording of the object by means of the X-ray system from the second position in order to obtain a second X-ray projection; and storing the at least first and second positions of the trajectory so as to be able to move to the first and second positions at a later point in time or in the measurement to be performed, representing the second X-ray projection or information derived from the second X-ray projection, when said computer program is run by a computer.

According to another embodiment, an apparatus for operating an X-ray system having at least a manipulator, an X-ray source and an X-ray detector, may have: virtual input means for setting a first and/or a second position for the X-ray system on a trajectory; means for simulating recording of the object by means of the X-ray system from the first position and from the second position; a memory for storing the at least first and second positions of the trajectory in order to be able to move to the first and second positions at a later point in time or in the measurement to be performed; and output means for representing the partial X-ray recording or information describing the partial X-ray recording.

According to another embodiment, an apparatus for operating an X-ray system having at least a manipulator, an X-ray source and an X-ray detector, may have: virtual input means for setting a first and/or a second position for the X-ray system on a trajectory; means for recording and/or simulating recording of the object by means of the X-ray system from the first position and from the second position; and output means for representing the partial X-ray recording or information describing the partial X-ray recording; wherein the virtual input means have augmented reality input means, at least one sensor glove and/or at least one pointer for marking a position in 3D space.

Still another embodiment may have an X-ray system having an inventive apparatus as mentioned above.

Embodiments of the present invention provide a method for operating an X-ray system, wherein an X-ray system is assumed which comprises at least a manipulator, like a robot or linear drive, for example, an X-ray source and an X-ray detector. Advantageously, either the object to be examined or the X-ray source or the X-ray detector is arranged on the manipulator. The unit arranged on the manipulator sets the trajectory by the different positions to be taken (depending on the manipulator position). At first, a first position on the trajectory is determined manually, i.e. by a user, by means of virtual input means (virtual reality input means or augmented reality input means) so that this position can be moved to either by the X-ray system in order to take a recording or image of the object from the first position, or recording can be simulated. This step is repeated for a second position on the trajectory. A respective (X-ray) recording is taken or simulated from these two positions in order to obtain two X-ray projections. In a step performed in parallel to recording/simulating, information describing one of or both X-ray projections (for example by means of a live image) or describing the X-ray projections are output so that the user obtains feedback as to whether further or different X-ray projections are needed.

In correspondence with embodiments, the X-ray system is a CT system. This means that the method comprises the optional step of reconstructing a CT data set based on the at least two X-ray recordings. Based on the two (first and second) X-ray projections, reconstructing the CT data set can already be started, wherein only a partial CT data set can mostly be obtained with two X-ray projections. In this case, the partial CT data set is output to the user (or information thereon) so that the user can decide on which further angles in space are to be moved to.

Embodiments of the present invention are based on the finding that an X-ray system or also a CT system can be controlled very easily and intuitively when (firstly) the individual positions on the trajectory can be adjusted directly by the user and when (secondly) the user receives direct feedback on the data measured so far, for example using a first radiographic recording, an incomplete reconstruction in the case of the CT system or using data based on previous recordings. This may also be referred to as visual control even when controlling does not take place using the classical parameter-based approach, but using virtual input means. By means of these input means, the user can move the components of the X-ray/CT system, like the X-ray tube or an X-ray detector, virtually so that this movement can subsequently be processed by the real X-ray/CT system, like by moving the robot in the case of a robot-assisted system. Such an approach advantageously does no longer require complicated planning of trajectories. This means that planning and installing complex object holders may basically be omitted. Additionally, the situation of so-called "trial and error" measurements is avoided where the parameters are varied again and again when planning the trajectory until the construction result complies with expectations. Expressed differently, this means that the "what you see is what you get" principle can be realized using such an X-ray system.

In correspondence with embodiments, the virtual input means are realized by a sensor glove or by using the X-ray system actuator technology as input means, for example. In the case of the sensor glove, the movable components of the X-ray system are positioned in space virtually (key word: virtual reality, but also augmented reality). In the concept of using the actuator technology as sensor technology, the movable components of the X-ray system can be shifted correspondingly, which can be realized in most manipulators/robots by a so-called "force-free mode" so that the different positions on the trajectory can be adjusted directly. This is referred to as "manually guided tactile movement". In correspondence with embodiments, these positions are stored correspondingly both in the virtual and in real positioning so that the positions can be moved to again at a later time or in the measurement to be performed. Based on such virtual input means, it becomes clear that this also allows determining and moving to complex trajectories which do not correspond to analytically describable standard geometries, like circle or helix, in a simple way. Here, the operator does not have to be in possession of expert knowledge on operating the system, for example in relation to the specific parameters of the trajectory. Such a robot-assisted X-ray system is as easy to operate as a laboratory system for circle CT applications.

In correspondence with embodiments, for radiographic recordings, the partial CT data set, i.e. the reconstructed voxel model (generally: the CT reconstruction) can be output to the user as feedback, for example using a screen or using virtual reality means, like 3D glasses, for example. In correspondence with further embodiments, it would also be conceivable for the user, instead of the X-ray recording, to be returned to only information on the same, like a statement on the quality or resolution achieved by the recordings taken so far. A classical task of X-ray systems in material testing is finding errors, like voids in the material. In correspondence with further embodiments, the evaluation result may alternatively also be fed back to the user, instead of the X-ray recording or image.

Based thereon, the user is able to determine whether further positions are possible. In correspondence with another embodiment, the method comprises the step of manually setting another position and recording or simulating the recording from the further position. By iteratively supplementing the data set for the CT/X-ray recording, large savings in time can be achieved in the manual escalation test, since taking an unneeded number of X-ray recordings or taking X-ray recordings from positions with no additional information contents can be avoided.

It is to be pointed out here that the first and/or second position of the trajectory is/are defined by the position of the X-ray source and the X-ray detector relative to the object or relative to one another. Further embodiments relate to a method for an X-ray system, which comprises two (maybe multi-element) robots, for example, wherein one robot supports the X-ray source and the other robot supports the X-ray detector, so that these are movable relative to each other and, in particular, around the object.

Further embodiments relate to a computer program for performing the above method. In accordance with further embodiments, the method may also be performed by an apparatus for operating an X-ray system. This apparatus comprises the virtual input means for setting the first and/or second positions for the X-ray system on the trajectory, means for recording and/or simulating the recording from the first and/or second positions. Additionally, the apparatus also comprises output means, like 3D glasses or a simple screen for representing the X-ray recording (like in the live mode), the partial CT data set or information describing the partial X-ray recording. Another embodiment relates to an X-ray system and to a CT system comprising such an apparatus.

BRIEF DESCRIPTION OF THE DRAWINGS

Embodiments of the present invention will be discussed below referring to the appended drawings, in which.

DETAILED DESCRIPTION OF THE INVENTION

Before discussing below embodiments of the present invention referring to the appended drawings, it is to be pointed out that elements and structures of equal effect are provided with equal reference numerals, so that the description thereof is mutually applicable and interchangeable.

Figure 1A:
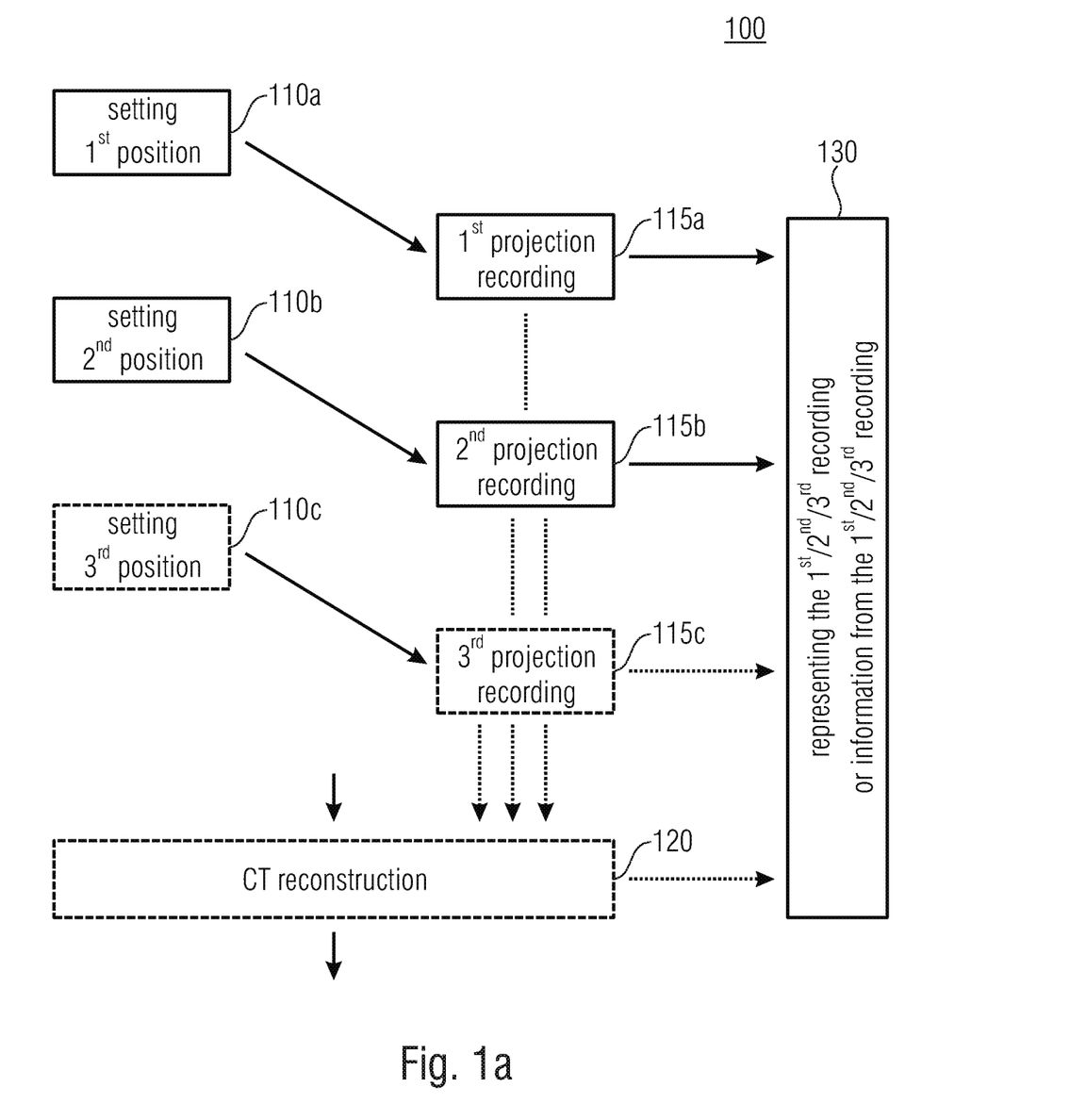
FIG. 1a shows a schematic flowchart of a method for operating an X-ray system in accordance with a basic embodiment.

FIG. 1a shows a method 100 for operating an X-ray system, in this case exemplarily a CT system, comprising a total of six basic steps 110a, 115a, 110b, 115b, 120. These steps can be subdivided into purely manual steps, i.e. performed by the user, and, at least advantageously, automatically executed steps.

Steps 110a and 115a are coupled to each other. Here, step 110a is a manual step, i.e. setting a first position for the manipulator on the trajectory. This first step is performed by virtual input means (virtual reality input means), like a sensor glove, a glove monitored by a camera or a pointing element monitored by a camera, for example. Generally, such virtual input means are means for marking a position in space.

Based on the first position determined in step 110a, a first recording is either taken or at least simulated. This takes place in step 115a. When recording or simulating the recording, the first position is assumed and the result obtained is a first X-ray projection. This first position is illustrated exemplarily in FIG. 1b.

Figure 1B:
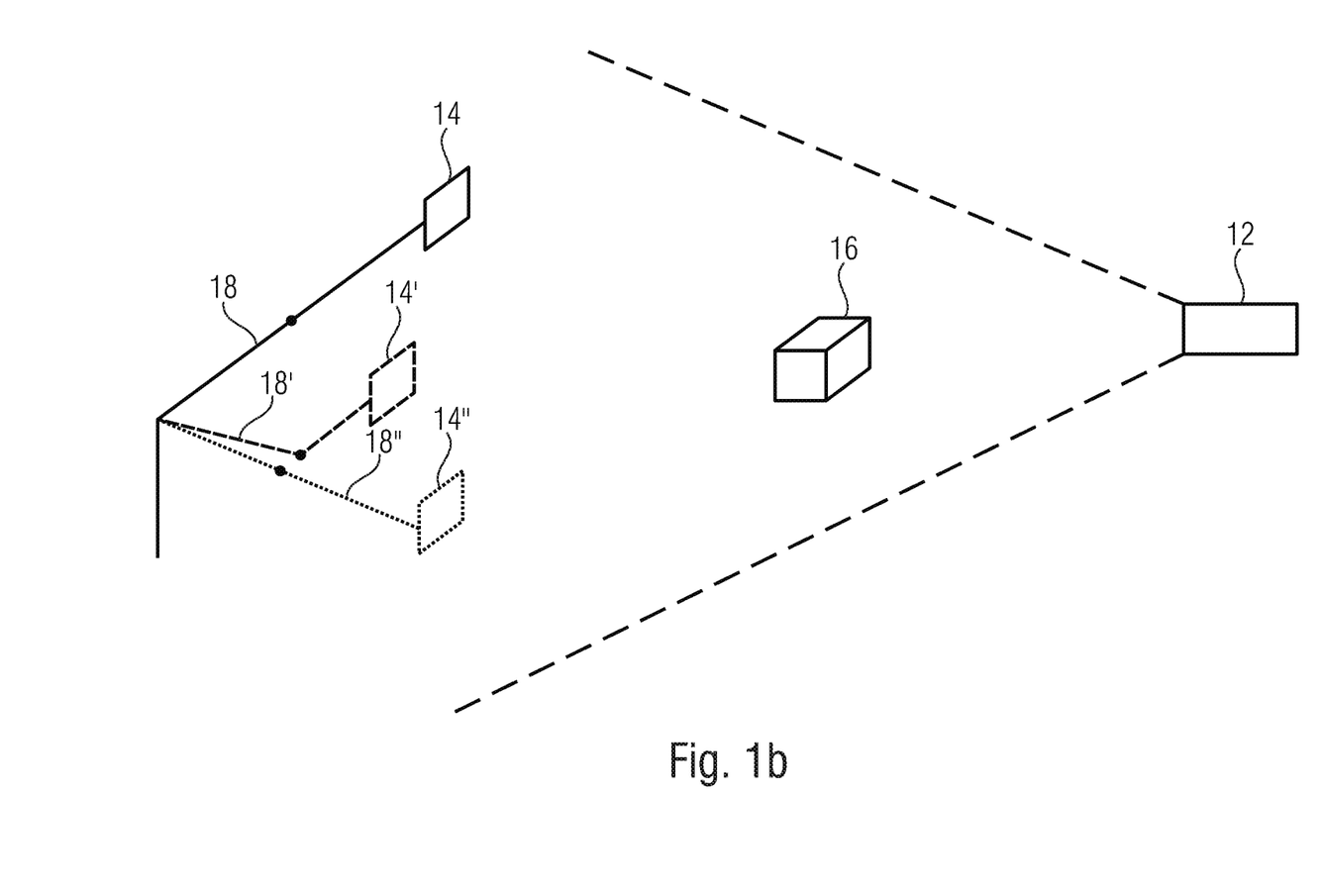
FIG. 1b shows a block diagram of an X-ray system which can be operated by means of the method of FIG. 1a, in accordance with an embodiment.

FIG. 1b shows an X-ray system 10 having a fixed X-ray source 12 and a movable detector 14, an object 16 to be examined being arranged between the movable detector 14 and the X-ray source 12. The movable detector 14 is movable around the object 16 or around the X-ray source 12 using a manipulator, in this case a simple single-joint manipulator 18 having a swivel arm. The first position of the manipulator 18 and, thus, the first position of the detector 14 or, generally, the first position of the elements 12, 14 and 16 relative to one another are illustrated in FIG. 1b by continuous lines. Based on this relative positioning of the elements 12, 14, 16 among one another, the first projection recording is taken.

Since no X-ray reconstruction is possible with only a single projection recording, in a next step 110b, which is comparable to step 110a, the second position is set so that, in step 115b (comparable to step 115a), the second recording can be taken or simulated in order to obtain the second X-ray projection.

The second position of the manipulator is shown in FIG. 1b by means of broken lines and provided with the reference numeral 18'. The second position of the X-ray detector 14' also results from this. As a result, the second X-ray projection represents the object 16 from a different position, like, for example, from a different angle.

Both during and directly after the first X-ray recording 115a, and during and directly after the second X-ray recording 115b, in step 130, the same are represented for the user so that the user gets direct feedback and, based thereon, can decide whether further recordings are needed, for example since the void searched in the object 16 is not contained in the section having been taken by the recording in step 115a, or, based thereon, can plan the next positions (cf. step 110b). As an alternative to step 130, it would also be conceivable for the user not to obtain the graphical representation of the recording, but only information on the recording.

In the present case of a CT system, the two radiographic recordings are combined so that a CT reconstruction can be performed. This CT reconstruction is performed in subsequent step 120 where the at least two X-ray projections are combined with one another. Based on such a reconstruction, a voxel model for representing the 3D volume of the object 16 including the attenuation coefficients per volume part or a model for identifying 2D areas of the object 16 can be obtained. Alternatively, the CT data set can be evaluated such that direct identification of voids in the volume of the object 16 is possible, for example.

Usually, such a reconstruction needs a plurality of separate projections in order to provide a reconstruction with a sufficient resolution or, generally, sufficient quality. In order not to take a plurality of projection recordings from all possible kinds of angles, as is the case in known technology, in parallel step 130, the partial CT data set, i.e. the incompletely reconstructed model, is represented so that the user here gets direct visual feedback as to whether the positions taken so far or planned on the trajectory are sufficient or not.

Based on this feedback, the user can then decide whether to take further reconstruction recordings (cf. optional steps 110c and 115c).

In correspondence with further embodiments, the user performs step 110c (optional step) in order to set a third position on the trajectory. Based on this third position, in step 115c, a third projection recording is taken, which is then represented either directly in continuous step 130 (case: 2D X-ray) or added to the reconstruction in the case of CT when repeating step 120 and output to the user in step 130.

Thus, elements of complex geometry can be tested with no complicated parameterization or calculation. The operator is easily able to verify the correct functioning of the system, like, for example, whether the reconstruction result still corresponds to the specifications. It is to be pointed out here that steps 115a, 115b, 120 and 130, in correspondence with embodiments, are performed in an automated manner.

The method presented describes an interactive concept of operating X-ray systems. This is an intuitive variation, based on feedback, of operating X-ray systems using external control devices, like gloves, virtual reality (VR) glasses, joysticks, etc. It is of advantage with this method that the user here gets direct feedback on the current result from the data measured so far, i.e. by a kind of live image, by visualizing the reconstructed data set or indicating evaluation quantities, like measures of image quality. This means that the method is a combination of operating a system and direct feedback of the data measured, which means that the user here can decide directly whether and when the measurement data present are sufficient in order to be able to solve the problem present. It is to be pointed out here that in the applications, emphasized here, of industrial X-ray testing, like material testing, permanent exposure to light may also be employed in order to allow a live image in step 130 since, in contrast to medical applications, the radiation dose does not have a negative impact on the test object.

In correspondence with further embodiments, depending on the previous data quality, further positions can be moved to (cf. step 110c) X-ray projections of these be taken (cf. step 115c). Such a further position is illustrated in FIG. 1b by means of dotted lines (cf. manipulator 18'' and detector 14'').

Figure 2A:
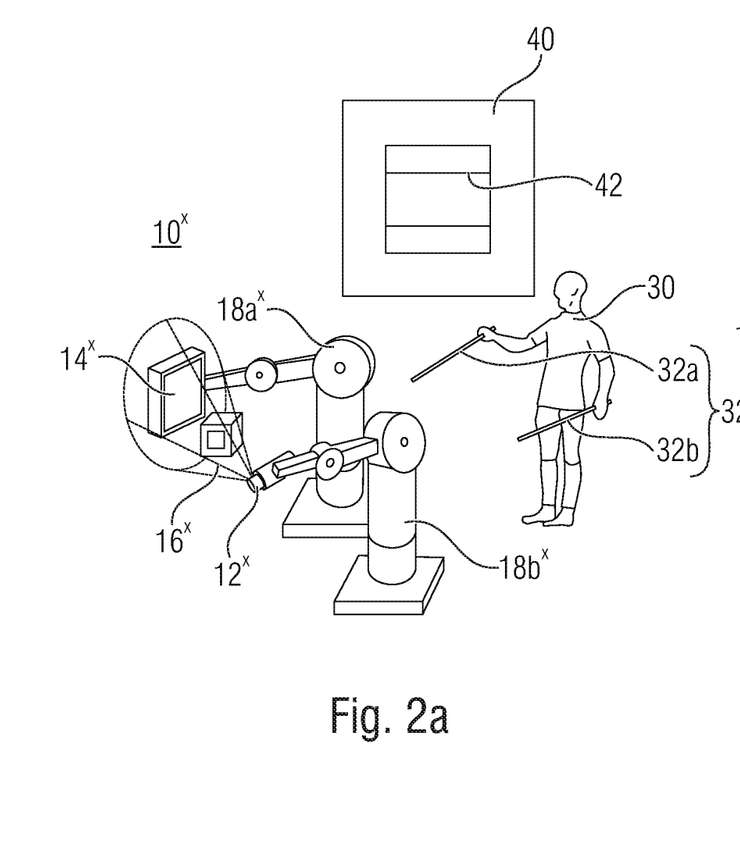
FIGS. 2a/b show a block diagram of an extended X-ray system which can also be operated using the method from FIG. 1a, in accordance with an embodiment in two different positions.
Figure 2B:
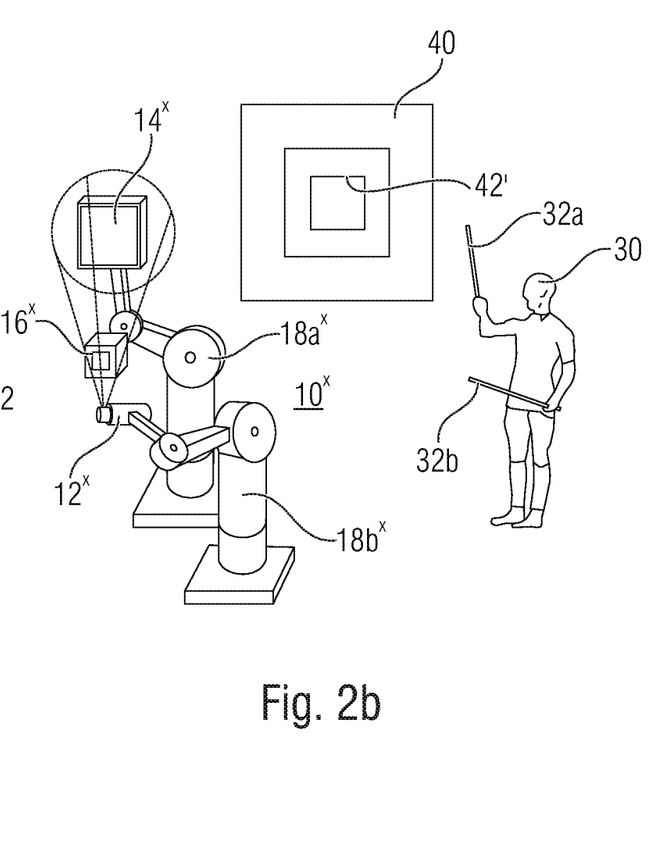

An extended embodiment will be discussed referring to FIGS. 2a and 2b. FIG. 2a shows a first configuration of the CT system, i.e. a first position, whereas FIG. 2b represents a second configuration (second position).

FIG. 2a shows a CT system 10* comprising a first robot 18a* and a second robot 18b*. The X-ray detector 14* is arranged on the first robot 18a*, whereas the radiation source 12* is arranged on the second robot 18b*. Both robots 18a* and 18b* are multi-element robots so that the X-ray detector 14* and the radiation source 12* are movable independently of each other. The object to be examined 14* is arranged between the two elements 12* and 14*.

As can be recognized, the degrees of freedom of the robots 18a* and 18b* allow the object 16* to be imaged basically from all possible perspectives around the same and at different distances thereto.

FIG. 2a illustrates a first position or location of the two robots 18a* and 18b*, corresponding to the first position on the trajectory of the CT system 10*. The first position is set by the user 30 next to it who sets both the robot 18a* and the robot 18b* in their positions by means of VR input means 32.

In this embodiment, the VR input means 32 are realized by two pointing means, in this case pointers 32a and 32b, which the user 30 can guide freely in space. This position of the pointers 32a and 32b and/or the orientation of the pointers 32a and 32b in space is transferred directly to the CT system 10* by means of a controller (not illustrated) and, based thereon, the robots 18a* and 18b* are oriented. When comparing the position of the user 30 and the configuration of the X-ray system 10*, it becomes clear that the robots 18a* and 18b* follow the position of the user 30.

In detail, this means that the stick 32a is oriented horizontally by the user 30 and, more precisely, by the right hand of the user 30, so that the robot 18a* which follows the stick 32a is also oriented horizontally. In analogy, the stick 32b and, consequently, the robot arm of the robot 18b*, are also oriented horizontally.

In this first position, a first projection is taken which is represented to the user 30 by means of the representing means 14, in this case a display. Based on the first projection, only two-dimensional shadows, here 42, can be recognized so that the user 30 will realize that the object 16* has to be recorded with at least a second angle. The second position on the trajectory of the X-ray system 10* is illustrated in FIG. 2b.

FIG. 2b also represents the X-ray system 10*. The orientation of the robots 18a* and 18b* is still dependent on the position of the user 30. The user 30 directs the pointing element 32a (right hand) perpendicularly upwards so that consequently the robot arm of the robot 18a* is also oriented perpendicularly upwards, the consequence being that the detector 14* is positioned in space further upwards when compared to the configuration of FIG. 2a.

In the illustration of FIG. 2b, the user 30 holds the second pointer 32b in a somewhat angled manner, the consequence being that the robot arm of the robot 18b*, at least when compared to the configuration of FIG. 2a, is angled and, consequently, the X-ray source 12' is closer to the object 16*.

A second X-ray recording is taken in this second position and the reconstruction result represented again using the display means 40. Here, not only the shadow 42 can be represented, but also an outline 42' so that the user gets direct feedback on the manipulation performed.

The functionality of this embodiment of FIGS. 2a and 2b can be described as follows: the user is able to move the system "manually" until the 3D data available are sufficient for evaluation. Here, in correspondence with embodiments, the user 30 can mark the position as a recording position, for example by means of a button, so that either the recording by means of a CT system is triggered or the position is at least stored. The concept allows reacting to different element geometries with little complexity, like rebuilding the system or complicated trajectory planning. Manually generated trajectories can be stored and moved to again, if needed.

In the embodiments of FIGS. 2a and 2b, it was assumed that the VR input means 30 are pointers, for example. It is to be pointed out here that, in correspondence with further embodiments, other input means can be used, like gloves, which are tracked using a camera, or, generally, pure camera tracking or sensor gloves. Such gloves, in combination with 3D representation, for example using 3D glasses, are particularly sensible when controlling not only the pure position and orientation of the robot or X-ray source/sensor mounted, but also an angular position of the robot. Alternatively, a joystick, or generally sticks, as are, for example, known from gaming consoles, may be used as VR input means. It is common to all such VR input means that a movement of the user can be transferred to a movement of at least one of the robots 18a* or 18b* or, generally, the CT system by using a calculating unit.

In correspondence with further embodiments, it would also be conceivable for virtual means, like 3D glasses (keyword "augmented reality") to be used instead of the display 40, based on which the user can position the robot in space considerably easier, for example without touching the robot, radiation source, radiation detector or object in a tactile manner.

In correspondence with further embodiments, it would also be conceivable for the VR input means to be realized by the robots themselves by switching them to the so-called "free movement mode", for example, wherein these can simply be shifted by the user manually.

In all the above embodiments, it has been assumed that an X-ray projection is performed directly during the method. However, this is not necessarily the case; in correspondence with further embodiments, it is sufficient to only simulate the separate recordings so as to perform trajectory planning. Thus, in correspondence with embodiments, not the actually reconstructed partial CT data set is represented, but only a simulation thereof. This is particularly sensible in relation to planning the measurements. As an alternative to visually displaying the reconstruction result from the radiographic images recorded so far (like using an iterative reconstruction method), a result of an evaluation, like number of the currently detectable errors in the object or an indication of evaluation quantities, like image quality or resolution, would also be conceivable. A combination of these specific features would also make sense.

The method can be employed effectively for robot-supported computer tomography systems in particular since here usually two or more industrial robots are positioned freely in space and the X-ray components are mounted thereto manually. Such systems are mostly configured for an X-ray examination of very large objects, like plane elements (wings) or car bodies which, due to their shape, do not allow trajectories of straight (or circular) movements. Operating and planning the trajectory (comprising any points in space around the object) for such system usually are highly complex and cannot be solved in a cost-efficient manner for continuously changing demands. This problem can be solved efficiently using an interactive operation concept. Even complex trajectories can be set up specifically and be tested as to their quality. Quality here means that the data generated provide the results desired in correspondence with the application.

In escalation testing, elements are frequently examined manually based on suspected defects. This manual testing is frequently subject to limitations, like the geometry of the element and the possible trajectories in this respect. The operating concept allows specifically examining suspicious defects without having to perform complicated calculations. The operating concept makes planning and realizing modern system concepts easier where one or several components and the object are moved by complex manipulation systems. Describing the trajectory and planning for such systems have not been solved so far or only insufficiently.

Even when, in the above embodiments, it has been assumed that the X-ray source and/or X-ray detector are coupled to the manipulator or robot and are moved by the same around the object or relative to the object, it is to be pointed out that, in correspondence with embodiments, the object itself can be moved by means of a manipulator, like a robot or linear drive (relative to the exemplarily fixed X-ray source and/or the exemplarily fixed X-ray detector) in order to move to the specific position on the trajectory. In accordance with further embodiments, all three elements (object, X-ray source and X-ray detector) may also be moved so as to effect a relative movement between the same.

Although some aspects have been described in the context of an apparatus, it is clear that these aspects also represent a description of the corresponding method, such that a block or device of an apparatus also corresponds to a respective method step or a feature of a method step. Analogously, aspects described in the context with or as a method step also represent a description of a corresponding block or item or feature of a corresponding apparatus. Some or all of the method steps may be executed by (or using) a hardware apparatus, like a microprocessor, a programmable computer or an electronic circuit, for example. In some embodiments, some or several of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier.

In other words, an embodiment of the inventive method is, therefore, a computer program comprising program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, like a computer or a programmable logic device, for example, configured to or adapted to perform one of the methods described herein.

A further embodiment comprises a computer having installed thereon the computer program for performing one of the methods described herein.

A further embodiment according to the invention comprises an apparatus or a system configured to transfer a computer program for performing at least one of the methods described herein to a receiver. The transmission can, for example, be performed electronically or optically. The receiver may, for example, be a computer, a mobile device, a memory device or the like. The apparatus or system may, for example, comprise a file server for transferring the computer program to the receiver.

In some embodiments, a programmable logic device (like a field-programmable gate array, FPGA, for example) may be used to perform some or all of the functionalities of the methods described herein. In some embodiments, a field-programmable gate array may cooperate with a microprocessor in order to perform one of the methods described herein. Generally, in some embodiments, the methods may be performed by any hardware apparatus. This can be universally applicable hardware, such as a computer processor (CPU), or hardware specific for the method, such as ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A method for operating an X-ray system comprising at least a manipulator, an X-ray source and an X-ray detector, the manipulator being able to move the X-ray source, the X-ray detector or an object, comprising:
    manually setting a first position for the manipulator on a trajectory by means of a virtual input unit;
    simulating recording of the object by means of the X-ray system from the first position in order to acquire a first X-ray projection;
    representing the first X-ray projection or information derived from the first X-ray projection;
    manually setting a second position on the trajectory by means of the virtual input unit based on the representation of the first X-ray projection or information derived from the first X-ray projection;
    simulating recording of the object by means of the X-ray system from the second position in order to acquire a second X-ray projection; and
    storing the at least first and second positions of the trajectory so as to be able to move to the first and second positions at a later point in time or in the measurement to be performed,
    representing the second X-ray projection or information derived from the second X-ray projection.

2. The method in accordance with claim 1, wherein the X-ray system is a CT system and the method comprises starting reconstructing the CT data set based on the first and second X-ray projections in order to acquire a partial CT data set; and
    wherein representing the first and second X-ray projections or the information derived from the first and second X-ray projections comprises representing the partial CT data set or information describing the partial CT data set.

3. The method in accordance with claim 2, wherein the partial CT data set is an incomplete reconstruction or evaluation of the incomplete reconstruction in relation to a test task.

4. The method in accordance with claim 1, wherein the information derived from the first and second X-ray projections or the information describing the partial CT data set are information relating to the resolution of the X-ray recording or the CT data set or information on the quality of the X-ray recording or the CT data set.

5. The method in accordance with claim 1, the method comprising manually setting a further position for the X-ray system by means of the virtual input unit and recording or simulating recording of the objection by means of the X-ray system from the further position in order to acquire a further projection.

6. The method in accordance with claim 5, wherein the steps are repeated until the X-ray recording or the partial CT data set corresponds to a predetermined quality and/or resolution.

7. The method in accordance with claim 1, wherein the method comprises moving to the first position before recording or simulating recording from the first position, and wherein the method comprises moving to the second position before recording or simulating recording from the second position.

8. The method in accordance with claim 1, wherein the manipulator comprises a robot or multi-element robot; and/or
    wherein the first and/or second positions is/are defined by the position of the robot or by the positions of several elements of the multi-element robot.

9. The method in accordance with claim 1, wherein the X-ray system comprises two manipulators, wherein the first of the two manipulators supports the X-ray source and the second of the two manipulators supports the X-ray detector,
    wherein the two manipulators are movable independently of each other, and
    wherein the first position and/or the second position on the trajectory represent/s a combination of the positions of the two manipulators.

10. The method in accordance with claim 1, wherein the manipulator is configured to move the object and/or to move the object relative to the X-ray source and/or to the X-ray detector in order to move to the first position and/or the second position on the trajectory.

11. The method in accordance with claim 1, wherein the first and/or second position of the trajectory is/are defined by the position of the X-ray source and the X-ray detector relative to the object and/or relative to each other.

12. The method in accordance with claim 1, wherein the virtual input unit comprises a virtual reality input unit, an augmented reality input unit, at least one sensor glove and/or at least one pointer for marking a position in 3D space.

13. The method in accordance with claim 1, wherein the virtual input unit is formed by the manipulator itself so that a manual movement of the manipulator is interpreted to be an input.

14. The method in accordance with claim 1, wherein each manipulator is provided with a virtual input unit.

15. The method in accordance with claim 1, wherein the X-ray source and the X-ray detector are configured for permanent exposure to light.

16. The method in accordance with claim 1, wherein recording the object by means of the X-ray system from the first and second positions is performed continuously; and representing the first and second X-ray projections is performed as live recordings.

17. A method for operating an X-ray system comprising at least a manipulator, an X-ray source and an X-ray detector, the manipulator being able to move the X-ray source, the X-ray detector or an object, comprising:
- manually setting a first position for the manipulator on a trajectory by means of a virtual input unit;
- recording or simulating recording of the object by means of the X-ray system from the first position in order to acquire a first X-ray projection;
- representing the first X-ray projection or information derived from the first X-ray projection;
- manually setting a second position on the trajectory by means of the virtual input unit based on the representation of the first X-ray projection or information derived from the first X-ray projection;
- recording or simulating recording of the object by means of the X-ray system from the second position in order to acquire a second X-ray projection; and
- representing the second X-ray projection or information derived from the second X-ray projection;
- wherein the virtual input unit comprises an augmented reality input unit, at least one sensor glove and/or at least one pointer for marking a position in 3D space.

18. A method for operating an X-ray system comprising at least a manipulator, an X-ray source and an X-ray detector, the manipulator being able to move the X-ray source, the X-ray detector or an object, comprising:
- manually setting a first position for the manipulator on a trajectory by means of a virtual input unit;
- recording or simulating recording of the object by means of the X-ray system from the first position in order to acquire a first X-ray projection;
- representing the first X-ray projection or information derived from the first X-ray projection;
- manually setting a second position on the trajectory by means of the virtual input unit based on the representation of the first X-ray projection or information derived from the first X-ray projection;
- recording or simulating recording of the object by means of the X-ray system from the second position in order to acquire a second X-ray projection; and
- representing the second X-ray projection or information derived from the second X-ray projection;
- wherein the X-ray system is a CT system and the method comprises starting reconstructing the CT data set based on the first and second X-ray projections in order to acquire a partial CT data set; and
- wherein representing the first and second X-ray projections or the information derived from the first and second X-ray projections comprises representing the partial CT data set or information describing the partial CT data set;
- wherein the method comprises manually setting a further position for the X-ray system by means of the virtual input unit and recording or simulating recording of the objection by means of the X-ray system from the further position in order to acquire a further projection;
- wherein the steps are repeated until the X-ray recording or the partial CT data set corresponds to a predetermined quality and/or resolution.

19. A non-transitory digital storage medium having stored thereon a computer program for performing a method for operating an X-ray system comprising at least a manipulator, an X-ray source and an X-ray detector, the manipulator being able to move the X-ray source, the X-ray detector or an object, comprising:
- manually setting a first position for the manipulator on a trajectory by means of a virtual input unit;
- simulating recording of the object by means of the X-ray system from the first position in order to acquire a first X-ray projection;
- representing the first X-ray projection or information derived from the first X-ray projection;
- manually setting a second position on the trajectory by means of the virtual input unit based on the representation of the first X-ray projection or information derived from the first X-ray projection;
- simulating recording of the object by means of the X-ray system from the second position in order to acquire a second X-ray projection; and
- storing the at least first and second positions of the trajectory so as to be able to move to the first and second positions at a later point in time or in the measurement to be performed,
- representing the second X-ray projection or information derived from the second X-ray projection,
- when said computer program is run by a computer.

20. An apparatus for operating an X-ray system comprising at least a manipulator, an X-ray source and an X-ray detector, comprising:
- a virtual input means configured to receive a virtual input command for setting a first and/or a second position for the X-ray system on a trajectory;
- a unit comprising a processor configured to simulate recording of the object by means of the X-ray system from the first position and from the second position;
- a memory for storing the at least first and second positions of the trajectory in order to be able to move to the first and second positions at a later point in time or in the measurement to be performed; and
- an output means configured to output data representing the partial X-ray recording or data comprising information describing the partial X-ray recording.

21. An apparatus for operating an X-ray system comprising at least a manipulator, an X-ray source and an X-ray detector, comprising:
- a virtual input means configured to receive a virtual input command for setting a first and/or a second position for the X-ray system on a trajectory;
- a unit comprising a processor configured to record or simulate recording of the object by means of the X-ray system from the first position and from the second position; and
- an output means configured to output data representing the partial X-ray recording or data comprising information describing the partial X-ray recording;
- wherein the virtual human machine interface unit comprises an augmented reality input unit, at least one sensor glove and/or at least one pointer for marking a position in 3D space.

22. The apparatus in accordance with claim 20, wherein the virtual input unit is selected from the group of input units comprising a virtual reality input unit, an augmented reality input unit, at least one sensor glove and/or at least one pointer for marking a position in 3D space, and
wherein the manipulator comprises a robot or a multi-element robot, and wherein the first and/or second positions is/are defined by the position of the robot or by the positions of the several elements of the multi-element robot.

23. An X-ray system comprising an apparatus in accordance with claim 20.

24. The X-ray system in accordance with claim 23, implemented as a CT system and comprising a calculating unit for reconstructing the X-ray recording based on the first and second X-ray projections in order to acquire a partial X-ray recording.

* * * * *